(12) United States Patent
Jackson et al.

(10) Patent No.: US 11,708,453 B2
(45) Date of Patent: Jul. 25, 2023

(54) COPOLYESTER FROM TEREPHTHALIC ACID CONTAINING LOW DIETHYLENE GLYCOL

(71) Applicant: Eastman Chemical Company, Kingsport, TN (US)

(72) Inventors: Anne-Martine Sherbeck Jackson, Kingsport, TN (US); Rachel Elizabeth McLendon, Kingsport, TN (US); Bruce Roger DeBruin, Gray, TN (US); Michael Paul Ekart, Kingsport, TN (US); Dale Milton Blakely, Kingsport, TN (US); Robert Todd Harris, Johnson City, TN (US)

(73) Assignee: Eastman Chemical Company, Kingsport, TN (US)

(*) Notice: Subject to any disclaimer, the term of this patent is extended or adjusted under 35 U.S.C. 154(b) by 203 days.

(21) Appl. No.: 17/309,707

(22) PCT Filed: Dec. 17, 2019

(86) PCT No.: PCT/US2019/066702
§ 371 (c)(1),
(2) Date: Jun. 16, 2021

(87) PCT Pub. No.: WO2020/131778
PCT Pub. Date: Jun. 25, 2020

(65) Prior Publication Data
US 2022/0049050 A1 Feb. 17, 2022

Related U.S. Application Data

(60) Provisional application No. 62/780,641, filed on Dec. 17, 2018, provisional application No. 62/780,635, filed on Dec. 17, 2018.

(51) Int. Cl.
*C08G 63/199* (2006.01)
*C08G 63/183* (2006.01)
*C08G 63/66* (2006.01)

(52) U.S. Cl.
CPC ......... *C08G 63/199* (2013.01); *C08G 63/183* (2013.01); *C08G 63/66* (2013.01)

(58) Field of Classification Search
CPC ..... C08G 63/183; C08G 63/199; C08G 63/66
See application file for complete search history.

(56) References Cited

U.S. PATENT DOCUMENTS

| | | | |
|---|---|---|---|
| 3,057,909 A | 10/1962 | Sebelist et al. | |
| 4,077,945 A * | 3/1978 | Heinze | C08G 63/183 528/308.4 |
| 4,670,580 A * | 6/1987 | Maurer | C08G 63/78 560/204 |
| 5,243,022 A * | 9/1993 | Kim | C08G 63/78 528/308.8 |
| 5,681,918 A | 10/1997 | Adams et al. | |
| 5,856,424 A | 1/1999 | Bowers et al. | |
| 6,103,859 A | 8/2000 | Jernigan et al. | |
| 6,300,462 B1 | 10/2001 | Cliffton et al. | |
| 6,632,390 B1 | 10/2003 | Shelby et al. | |
| 7,915,374 B2 | 3/2011 | Jenkins et al. | |
| 8,114,954 B2 | 2/2012 | DeBruin | |
| 2004/0044170 A1 | 3/2004 | DeBruin | |
| 2005/0100696 A1* | 5/2005 | Shi | B29C 49/0005 428/35.7 |
| 2005/0131165 A1 | 6/2005 | Hale et al. | |
| 2007/0092672 A1* | 4/2007 | Colhoun | C08L 67/025 528/272 |
| 2010/0273956 A1 | 10/2010 | Jenkins et al. | |
| 2011/0091705 A1 | 4/2011 | Shih et al. | |

FOREIGN PATENT DOCUMENTS

| | | |
|---|---|---|
| JP | 200435660 A | 2/2004 |
| WO | WO 97 30102 A1 | 8/1997 |
| WO | WO 01 12697 A1 | 2/2001 |

OTHER PUBLICATIONS

Office Communication dated Jan. 30, 2023 received in U.S. Appl. No. 17/309,708.
Rieckmann, TH. et al., "Poly(Ethylene Terephthalate) Polymerization—Mechanism, Catalysis, Kinetics, Mass Transfer and Reactor Design"; Chapter II of Modern Polyesters, 2003.
Third-Party Submission under 37 CFR 1.290 dated Aug. 31, 2022 received in U.S. Appl. No. 17/309,708.
Co-pending U.S. Appl. No. 17/309,708, filed Jun. 16, 2021; Jackson et al.; now U. S. Publication No. 2022-0073676.
Notification of Transmittal of the International Search Report and the Written Opinion of the International Searching Authority, or the Declaration dated Mar. 23, 2020 received in International Application No. PCT/US2019/066702.
Notification of Transmittal of the International Search Report and the Written Opinion of the International Searching Authority, or the Declaration dated Mar. 23, 2020 received in International Application No. PCT/US2019/066706.

* cited by examiner

*Primary Examiner* — Frances Tischler
*Assistant Examiner* — Gennadiy Mesh
(74) *Attorney, Agent, or Firm* — Tammye L. Taylor Polk

(57) ABSTRACT

Process for preparing copolyesters by introducing TPA, EG, and CHDM at an EG:TPA molar ratio of 2.3:1 to 2.7:1 into a reaction zone; reacting TPA with EG and CHDM at a temperature of at least 250° C. and pressure of up to 40 psi to form a first esterification product; passing the first esterification product to a reaction zone; esterifying the first esterification product at a temperature of at least 250° C. and pressure of up to 20 psi to form a second esterification product, passing the second esterification product to a reaction zone; polycondensing the second esterification product in the presence of a catalyst to form a prepolymerization product; passing the prepolymerization product to one or more reaction zones; and polycondensing the prepolymerization product in the presence of the catalyst to form a copolyester comprising 1.0 wt % or less of DEG, without requiring the use of DEG-suppressing additives.

11 Claims, 1 Drawing Sheet

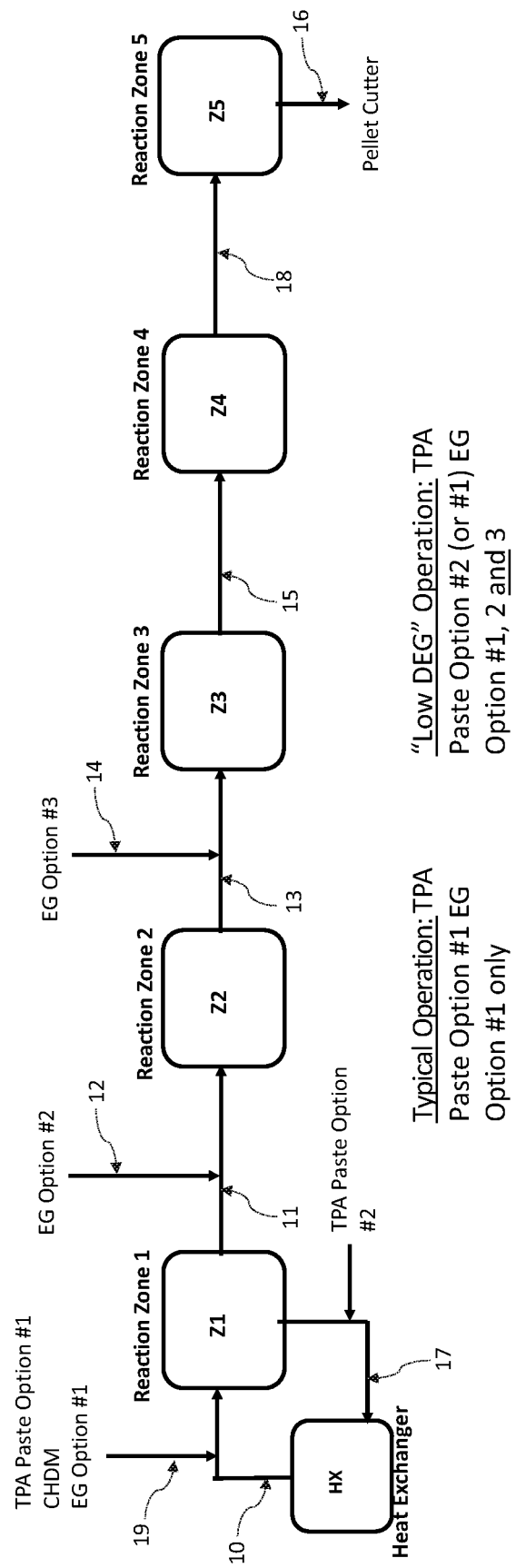

COPOLYESTER FROM TEREPHTHALIC ACID CONTAINING LOW DIETHYLENE GLYCOL

CROSS-REFERENCE TO RELATED APPLICATION(S)

This application is a national stage filing under 35 USC § 371 of International Application Number PCT/US2019/066702, filed on Dec. 17, 2019 which claims the benefit of the filing date to U.S. Provisional Application Nos. 62/780,635 and 62/780,641, both filed on Dec. 17, 2018, the entire disclosures of which are incorporated by reference herein.

FIELD OF THE INVENTION

The invention generally relates to the field of polymer chemistry. It particularly relates to copolyesters made from the direct esterification of terephthalic acid with diols including ethylene glycol, but which contain low diethylene glycol content, and processes for making the copolyesters.

BACKGROUND OF THE INVENTION

Copolyesters containing ethylene glycol (EG) typically form diethylene glycol (DEG) as a by-product. Glycol-modified polyethylene terephthalate (PETG) compositions with, for example, 31 mol % of CHDM produced from purified terephthalic acid (PTA, TPA) typically have a DEG level above 1.1 wt %, while an identical composition made from dimethyl terephthalate (DMT) will typically contain around 0.4 wt % of DEG.

Higher DEG levels can be detrimental to end-use properties. For example, the inclusion of DEG in the composition can lower the glass transition temperature ($T_g$) at a rate of ~2° C./1 wt % DEG. For certain applications where $T_g$ is close to the temperature at which the article will be used, even a slight inclusion of DEG can render the material unfit for the intended purpose. In addition to changing the final $T_g$, the inclusion of DEG in the polymer composition can change flow characteristics, thereby changing processing parameters which can be undesirable during processing steps, such as injection molding.

As noted, low DEG material can be achieved by using DMT as the terephthalate source in the polymer, but DMT resources are limited and are more expensive than TPA. Therefore, it is desirable to produce copolyesters from TPA, but with low DEG levels.

Several methods have been devised to reduce the formation of DEG in TPA-based copolyesters. For example, one method that has been used in polyethylene terephthalate (PET) produced from terephthalic acid is to add water to the esterification stage of the reaction. This method has been attempted on PETG at various levels of water, but showed a small effect. Moreover, adding too much water can be detrimental to the conversion in the esterification step, which can have a negative effect on the final inherent viscosity (IV) of the copolymer. Another method that has been attempted is adding buffers to the esterification stage, such as tetramethylammonium hydroxide or alkali metal carbonates. While these strategies may have been effective in lowering DEG in TPA-based polyesters, none of them involve simple process modifications without potential deleterious effect or avoiding the use of DEG-suppressing additives.

Thus, there is a need in the art to provide alternative and/or improved processes for producing EG-containing copolyesters from TPA with low DEG content, and copolyesters produced therefrom, that do not suffer from one or more of these drawbacks.

The present invention addresses this need as well as others, which will become apparent from the following description and the appended claims.

SUMMARY OF THE INVENTION

The invention is as set forth in the appended claims.

Briefly, in one aspect, the invention provides a process for preparing a copolyester. In various embodiments, the process comprises the steps of:
(a) introducing terephthalic acid (TPA), ethylene glycol (EG), and 1,4-cyclohexanedimethanol (CHDM) at an EG:TPA molar ratio of 2.3:1 to 2.7:1 into a first reaction zone (Z1);
(b) reacting TPA with EG and CHDM in Z1 at a melt temperature of at least 250° C. and a pressure of up to 40 psi to form a first esterification product comprising copolyester monomers, oligomers, or both and unreacted TPA, EG, and CHDM;
(c) passing the first esterification product to a second reaction zone (Z2);
(d) esterifying the unreacted TPA, EG, and CHDM in the first esterification product in Z2 at a melt temperature of at least 250° C. and a pressure of up to 20 psi to form a second esterification product comprising additional copolyester monomers, oligomers, or both;
(e) passing the second esterification product to a third reaction zone (Z3);
(f) polycondensing the second esterification product in the presence of a polycondensation catalyst in Z3 to form a prepolymerization product comprising copolyester oligomers;
(g) passing the prepolymerization product to one or more reaction zones (ZF); and
(h) polycondensing the prepolymerization product in the presence of the polycondensation catalyst in ZF to form a copolyester comprising 1.0 wt % or less of DEG.

In various other embodiments, the process comprises the steps of:
(a) introducing 1,4-cyclohexanedimethanol (CHDM) and a first portion of fresh ethylene glycol (EG1) into a first reaction zone (Z1);
(b) reacting EG1 and CHDM with a diacid in Z1 to form a first esterification product comprising copolyester monomers, oligomers, or both and unreacted EG1, CHDM, and diacid;
(c) withdrawing from Z1 an esterification recycle stream comprising unreacted EG1, CHDM, and diacid;
(d) passing the esterification recycle stream to a heat exchanger;
(e) heating the esterification recycle stream in the heat exchanger to form a heated esterification recycle stream;
(f) passing the heated esterification recycle stream back to Z1;
(g) introducing fresh diacid comprising terephthalic acid, isophthalic acid, or mixtures thereof (g1) upstream of the heat exchanger into the esterification recycle stream or (g2) downstream of the heat exchanger into Z1;
(h) passing the first esterification product to a second reaction zone (Z2);
(i) introducing a second portion of fresh ethylene glycol (EG2) into Z2;

(j) esterifying the unreacted EG1, CHDM, and diacid in the first esterification product and EG2 in Z2 to form a second esterification product comprising additional copolyester monomers, oligomers, or both;

(k) passing the second esterification product to a third reaction zone (Z3);

(l) introducing a third portion of fresh ethylene glycol (EG3) into Z3;

(m) polycondensing the second esterification product in the presence of a polycondensation catalyst in Z3 to form a prepolymerization product comprising copolyester oligomers;

(n) passing the prepolymerization product to one or more reaction zones (ZF); and (o) polycondensing the prepolymerization product in the presence of the polycondensation catalyst in ZF to form a copolyester containing 1.0 wt % or less of DEG.

In another aspect, the invention provides a copolyester. In various embodiments, the copolyester comprises:

(a) a diacid component comprising 100 mol % of residues of terephthalic acid, isophthalic acid, or mixtures thereof;

(b) a diol component comprising 19 to 96.5 mol % of residues of ethylene glycol, 3.5 to 81 mol % of residues of 1,4-cyclohexanedimethanol, and 0 to 0.4 mol % of residues of trimellitic anhydride;

(c) less than 0.5 wt % of methyl end groups; and (d) 1.0 wt % or less of diethylene glycol (DEG), wherein the copolyester is free of DEG-suppressing additives, wherein the copolyester has an inherent viscosity (IV) of 0.4 to 1.5 dL/g, wherein all weight percentages are based on the total weight of the copolyester; and wherein the diacid component is based on 100 mol % of total diacid residues in the copolyester and the diol component is based on 100 mol % of total diol residues in the copolyester.

BRIEF DESCRIPTION OF THE DRAWING

The FIGURE is a flow diagram of various processes according to the invention.

DETAILED DESCRIPTION OF THE INVENTION

It has been surprisingly discovered that it is possible to produce a low DEG value (e.g., 1 wt % or below) copolyester with a TPA-based feedstock by changing the processing conditions of temperature, pressure, and glycol/diacid feed mole ratio on new or existing polyester manufacturing assets.

Typically, copolyesters are produced in two main stages. The first stage reacts starting materials to form monomers and/or oligomers. If the starting materials entering the first stage include acid end groups, such as TPA or isophthalic acid, the first stage is referred to as esterification. The second stage further reacts the monomers and/or oligomers to form the final copolyester product. The second stage is generally referred to as the polycondensation stage. The polycondensation stage can be a single step or can be divided into a prepolycondensation (or prepolymerization) step and a final (or finishing) polycondensation step.

The FIGURE shows a process flow diagram for making PETG in accordance with various embodiments of the invention. While the FIGURE shows the reaction zones Z1 and Z2 as separate vessels, which are typically continuous stirred tank reactors (CSTRs), the vessels may be an integral unit having multiple esterification zones with appropriate partitions and controls. Likewise, while the reaction zones Z3, Z4, and Z5 are shown as separate vessels, which are typically CSTRs of the wipe film or thin film type, the vessels may be combined in one or more integral units having multiple polycondensation zones with appropriate partitions and controls. Various other types of esterification and polycondensation reactors as well as reactor arrangements are known in the art and may be adapted for use in accordance with the present disclosure.

Referring to the FIGURE, in typical commercial operations, a TPA paste that is made up of EG and TPA in a 2:1 mole ratio is fed into the location labeled "TPA Paste Option #1" via line 19. Additional EG is exclusively fed into the first reaction zone Z1 at the location labeled "EG Option #1" via line 19. CHDM is also fed into Z1 at the same location. While the FIGURE shows TPA paste, CHDM, and EG being added collectively to line 19, these raw materials may be added separately and/or directly into Z1.

The reaction mixture in Z1 is heated via a recycle loop that includes line 17, a heat exchanger, and line 10. Esterification takes place in Z1 to form a first esterification product comprising copolyester monomers, oligomers, or both and unreacted TPA, EG, and CHDM. The reaction product of Z1 is then passed to a second reaction zone Z2 via line 11. Further esterification takes place in Z2 to form a second esterification product comprising additional copolyester monomers, oligomers, or both. Typically, the average chain length of the monomer and/or oligomer exiting the esterification stage can be less than 25, from 1 to 20, or from 5 to 15.

The reaction product of Z2 is then passed to a third reaction zone Z3 via line 13. Polycondensation in the presence of a polycondensation catalyst takes place in Z3 to form a prepolymerization product comprising copolyester oligomers. Typically, Z3 converts the monomer exiting the esterification stage into an oligomer having an average chain length in the range of 2 to 40, 5 to 35, or 10 to 30.

The prepolymerization product is then passed to one or more reaction zones ZF (in this case, Z4 and Z5) via lines 15 and 18. Additional polycondensation in the presence of the polycondensation catalyst takes place in ZF to form a copolyester with the desired average chain length or IV. The copolyester is then withdrawn from ZF via line 16 for subsequent processing, such as formation into pellets via an extruder connected to an underwater pelletizer.

To achieve a low DEG product, in one mode of operation according to the invention, the pressures in Z1 and Z2 are lowered, the melt temperatures in Z1 and Z2 are raised, and the EG:TPA mole ratio is lowered relative to typical operating conditions. Table 1 below shows the typical operating conditions for Z1, Z2, Z3, Z4, and Z5 as well as the conditions for producing a low DEG product.

TABLE 1

|  | Typical Operation | Low DEG Mode (Preferred) |
| --- | --- | --- |
| Overall EG:TPA Mole Ratio | 2.8-4.0 | 2.3-2.7 |
| EG:TPA Mole Ratio-Z1 | 2.8-4.0 | 2.3-2.7 |
| Z1 Temperature (° C.) | 250-255 | 250-270 (257-265) |
| Z1 Pressure (psi) | 42-50 | 25-40 (30-40) |

TABLE 1-continued

|  | Typical Operation | Low DEG Mode (Preferred) |
|---|---|---|
| Z2 Temperature (° C.) | 250-255 | 250-270 (257-265) |
| Z2 Pressure (psi) | 25-30 | 8-20 |
| Z3 Temperature (° C.) | 263-273 | 263-273 |
| Z3 Pressure (torr) | 100-150 | 100-150 |
| Z4 and Z5 Temp (° C.) | 272-280 | 272-280 |
| Z4 Vacuum (torr) | 3.0-5.0 | 3.0-5.0 |
| Z5 Vacuum (torr) | 0.4-1.0 | 0.4-1.0 |

As seen in Table 1, the conditions in Z3, Z4, and Z5 during low DEG operation are generally the same as during typical operation. Experiments have shown that changes in Z3 conditions have little effect on the polymer DEG concentration and IV. The Z4 and Z5 temperatures and pressures, however, can be reactive to IV and can be very dependent on rate. Generally, the temperature can be raised, and the pressure can be lowered to increase IV as needed, while the opposite changes can be made to lower IV.

Thus, in one aspect, the invention provides a process for preparing a copolyester. In various embodiments, the process comprises:
(a) introducing terephthalic acid (TPA), ethylene glycol (EG), and 1,4-cyclohexanedimethanol (CHDM) at an EG:TPA molar ratio of 2.3:1 to 2.7:1 into a first reaction zone (Z1);
(b) reacting TPA with EG and CHDM in Z1 at a melt temperature of at least 250° C. and a pressure of up to 40 psi to form a first esterification product comprising copolyester monomers, oligomers, or both and unreacted TPA, EG, and CHDM;
(c) passing the first esterification product to a second reaction zone (Z2);
(d) esterifying the unreacted TPA, EG, and CHDM in the first esterification product in Z2 at a melt temperature of at least 250° C. and a pressure of up to 20 psi to form a second esterification product comprising additional copolyester monomers, oligomers, or both;
(e) passing the second esterification product to a third reaction zone (Z3);
(f) polycondensing the second esterification product in the presence of a polycondensation catalyst in Z3 to form a prepolymerization product comprising copolyester oligomers;
(g) passing the prepolymerization product to one or more reaction zones (ZF); and
(h) polycondensing the prepolymerization product in the presence of the polycondensation catalyst in ZF to form a copolyester comprising 1.0 wt % or less of DEG.

Preferably, the reacting step (b) is carried out at a melt temperature of at least 253° C., at least 255° C., or at least 257° C. Additionally or alternatively, the reacting step (b) is carried out at a melt temperature of not more than 290° C., not more than 285° C., not more than 280° C., not more than 275° C., not more than 270° C., or not more than 265° C. In various embodiments, the reacting step (b) is carried out at a melt temperature of 250 to 270° C., or 257 to 265° C.

Preferably, the reacting step (b) is carried out at a pressure of 25 to 40 psi, or 30 to 40 psi.

Preferably, the esterifying step (d) is carried out at a melt temperature of at least 253° C., at least 255° C., or at least 257° C. Additionally or alternatively, the esterifying step (d) is carried out at a melt temperature of not more than 290° C., not more than 285° C., not more than 280° C., not more than 275° C., not more than 270° C., or not more than 265° C. In various embodiments, the esterifying step (d) is carried out at a melt temperature of 250 to 270° C., or 257 to 265° C.

Preferably, the esterifying step (d) is carried out at a pressure of 8 to 20 psi.

Preferably, the average residence time of the reactants in the reacting step (b) is 2 hours or less, 1.75 hours or less, 1.5 hours or less, 1.25 hours or less, 1 hour or less, or 0.75 hours or less. In various embodiments, the average residence time of the reactants in the reacting step (b) is 30 to 40 minutes.

Preferably, the average residence time of the reactants in the esterifying step (d) is 2 hours or less, 1.75 hours or less, 1.5 hours or less, 1.25 hours or less, 1 hour or less, or 0.75 hours or less. In various embodiments, the average residence time of the reactants in the esterifying step (d) is 30 to 40 minutes.

To achieve a low or lower DEG copolyester, while maintaining a sufficiently high IV without taxing the final reaction zone(s) ZF, in addition to the modifications described above, a portion of the EG feed to the first esterification zone Z1 (EG Option #1) may be diverted to the second esterification zone Z2 via line 12 (EG Option #2) and to the third reaction zone Z3 via line 14 (EG Option #3). While EG feed lines 12 and 14 are shown as joining transfer lines 11 and 13, the diverted EG feed may be added directly to Z2 and Z3. General EG feed mole ratios for typical and low DEG modes of operation are shown in Table 2.

TABLE 2

|  | Overall EG:TPA Mole Ratio (Preferred) | EG:TPA Mole Ratio to Z1 (Preferred) | EG:TPA Mole Ratio to Z2 | EG:TPA Mole Ratio to Z3 |
|---|---|---|---|---|
| Typical Operation | 2.8-4.0 | 2.8-4.0 | 0 | 0 |
| Low DEG Operation | 2.3-3.0 (2.3-2.71) | 2.0-2.9 (2.0-2.69) | 0.01-0.15 | 0.01-0.15 |

To achieve an even lower DEG copolyester, the location of the TPA paste feed can be moved from the location labeled "TPA Paste Option #1" in the FIGURE (i.e., downstream of the heat exchanger but upstream of Z1) to the location labeled "TPA Paste Option #2" (i.e., upstream of the heat exchanger but downstream of Z1). As noted above, it is possible to achieve a low DEG product using TPA Paste Option #1, but it is preferable to move it to TPA Paste Option #2.

Thus, in various other embodiments, the process for making a copolyester according to the invention comprises:
(a) introducing 1,4-cyclohexanedimethanol (CHDM) and a first portion of fresh ethylene glycol (EG1) into a first reaction zone (Z1);
(b) reacting EG1 and CHDM with a diacid in Z1 to form a first esterification product comprising copolyester monomers, oligomers, or both and unreacted EG1, CHDM, and diacid;
(c) withdrawing from Z1 an esterification recycle stream comprising unreacted EG1, CHDM, and diacid;
(d) passing the esterification recycle stream to a heat exchanger;
(e) heating the esterification recycle stream in the heat exchanger to form a heated esterification recycle stream;
(f) passing the heated esterification recycle stream back to Z1;

(g) introducing fresh diacid comprising terephthalic acid, isophthalic acid, or mixtures thereof (g1) upstream of the heat exchanger into the esterification recycle stream or (g2) downstream of the heat exchanger into Z1;

(h) passing the first esterification product to a second reaction zone (Z2);

(i) introducing a second portion of fresh ethylene glycol (EG2) into Z2;

(j) esterifying the unreacted EG1, CHDM, and diacid in the first esterification product and EG2 in Z2 to form a second esterification product comprising additional copolyester monomers, oligomers, or both;

(k) passing the second esterification product to a third reaction zone (Z3);

(l) introducing a third portion of fresh ethylene glycol (EG3) into Z3; (m) polycondensing the second esterification product in the presence of a polycondensation catalyst in Z3 to form a prepolymerization product comprising copolyester oligomers;

(n) passing the prepolymerization product to one or more reaction zones (ZF); and (o) polycondensing the prepolymerization product in the presence of the polycondensation catalyst in ZF to form a copolyester containing 1.0 wt % or less of DEG.

In various embodiments, the fresh diacid is introduced (g1) upstream of the heat exchanger into the esterification recycle stream.

In various other embodiments, the fresh diacid is introduced (g2) downstream of the heat exchanger into Z1.

In various embodiments, the overall molar ratio of EG:TPA introduced into the process ranges from 2.3:1 to 3.0:1 where EG is the sum of EG1, EG2, and EG3 in moles.

In various embodiments, the overall molar ratio of EG:TPA introduced into the process ranges from 2.3:1 to 2.71:1 where EG is the sum of EG1, EG2, and EG3 in moles.

In various embodiments, the molar ratio of EG1:TPA ranges from 2.0:1 to 2.9:1, the molar ratio of EG2:TPA ranges from 0.01:1 to 0.15:1, and the molar ratio of EG3:TPA ranges from 0.01:1 to 0.15:1.

In various embodiments, the molar ratio of EG1:TPA ranges from 2.0:1 to 2.69:1, the molar ratio of EG2:TPA ranges from 0.01:1 to 0.15:1, and the molar ratio of EG3:TPA ranges from 0.01:1 to 0.15:1.

The temperature, pressure, and average residence time of the reacting step (b) in Z1 may be those described herein above for Z1.

In various embodiments, the reacting step (b) in Z1 is carried out at a melt temperature of 250 to 270° C. and a pressure of 25 to 40 psi.

In various embodiments, the reacting step (b) in Z1 is carried out at a melt temperature of 257 to 265° C. and a pressure of 30 to 40 psi.

The temperature, pressure, and average residence time of the esterify step (j) in Z2 may be those described herein above for Z2.

In various embodiments, the esterifying step (j) in Z2 is carried out at a melt temperature of 250 to 270° C. and a pressure of 8 to 20 psi.

In various embodiments, the esterifying step (j) in Z2 is carried out at a melt temperature of 257 to 265° C. and a pressure of 8 to 20 psi.

Polycondensation catalysts useful in the processes of the invention are not particularly limiting. Examples of such catalysts include titanium-based compounds, antimony-based compounds, and germanium-based compounds. Titanium catalysts are typically the most efficient and offer high polycondensation rates at low catalyst levels. The polycondensation catalysts may be added either during the esterification stage or the polycondensation stage. Generally, they are added with the feed materials into Z1. Typically, the catalyst is added in the range of 1 to 500 ppm, based on the weight of the copolyester. In the case of titanium, the catalyst may be added in the range of 1 to 50 ppm, based on the weight of the copolyester.

Phosphorus compounds are often added, along with the catalyst, to improve thermal stability. Phosphorus compounds useful as thermal stabilizers include phosphoric acid, phosphorous acid, phosphonic acid, phosphinic acid, phosphonous acid, and various esters and salts thereof. The esters can be alkyl, branched alkyl, substituted alkyl, difunctional alkyl, alkyl ethers, aryl, and substituted aryl. Typical thermal stabilizers include triphenyl phosphate Merpol A. Generally, phosphorus is added in the range of 10 to 100 ppm, based on the weight of the copolyester.

One or more other additives can be added to the starting materials, the copolyester, and/or the copolyester monomers/oligomers at one or more locations within the process. Suitable additives can include, for example, trifunctional or tetrafunctional comonomers, such as trimellitic anhydride, trimethylolpropane, pyromellitic dianhydride, pentaerythritol, or other polyacids or polyols; crosslinking or other branching agents; colorants; toners; pigments; carbon black; glass fibers; fillers; impact modifiers; antioxidants; UV absorbent compounds; oxygen scavenging compound; etc.

The processes according to the invention are particularly suitable for use on an industrial scale. For example, they may be practiced on commercial production lines capable of running at rates of 500 to 30,000 lbs/hr of polymer.

Preferably, the processes of the invention exclude adding DEG-suppressing additives. If added, preferably, they are not added in an amount that lowers the DEG content of the copolyester by, for example, 0.1 weight percent or more.

In another aspect, the invention relates to copolyesters produced from the processes of the invention. The copolyesters are characterized by having a DEG content of 1.0 wt % or less.

In various embodiments, the copolyester comprises:
(a) a diacid component comprising 100 mol % of residues of terephthalic acid, isophthalic acid, or mixtures thereof; and
(b) a diol component comprising 19 to 96.5 mol % of residues of ethylene glycol and 3.5 to 81 mol % of residues of 1,4-cyclohexanedimethanol,
wherein the diacid component is based on 100 mol % of total diacid residues in the copolyester and the diol component is based on 100 mol % of total diol residues in the copolyester.

In various embodiments, the copolyester comprises:
(a) a diacid component comprising 90 to 100 mol % of residues of terephthalic acid; and
(b) a diol component comprising 50 to 90 mol % of residues of ethylene glycol and 10 to 50 mol % of residues of 1,4-cyclohexanedimethanol,
wherein the diacid component is based on 100 mol % of total diacid residues in the copolyester and the diol component is based on 100 mol % of total diol residues in the copolyester.

In various embodiments, the copolyester comprises:
(a) a diacid component comprising 90 to 100 mol % of residues of terephthalic acid; and
(b) a diol component comprising 65 to 75 mol % of residues of ethylene glycol and 25 to 35 mol % of residues of 1,4-cyclohexanedimethanol, wherein the diacid component is based on 100 mol % of total diacid residues in the copolyester and the diol component is based on 100 mol % of total diol residues in the copolyester.

In various embodiments, the copolyester has an inherent viscosity of 0.4 to 1.5 dL/g or 0.6 to 0.9 dL/g.

In various embodiments, the copolyester comprises 0.9 wt % or less of DEG.

In various embodiments, the copolyester comprises 0.8 wt % or less of DEG.

In various embodiments, the copolyester comprises 0.7 wt % or less of DEG.

In various embodiments, the copolyester comprises 0.5 to 0.8 wt % of DEG.

In various embodiments, the copolyester comprises 0.5 to 0.7 wt % of DEG.

In various embodiments, the copolyester comprises 0.5 to 0.6 wt % of DEG.

In various other embodiments, the copolyester comprises:
(a) a diacid component comprising 100 mol % of residues of terephthalic acid, isophthalic acid, or mixtures thereof;
(b) a diol component comprising 19 to 96.5 mol % of residues of ethylene glycol, 3.5 to 81 mol % of residues of 1,4-cyclohexanedimethanol, and 0 to 0.4 mol % of residues of trimellitic anhydride;
(c) less than 0.5 wt % of methyl end groups; and
(d) 1.0 wt % or less of diethylene glycol (DEG),
wherein the copolyester is free of DEG-suppressing additives,
wherein the copolyester has an inherent viscosity (IV) of 0.4 to 1.5 dL/g,
wherein all weight percentages are based on the total weight of the copolyester; and
wherein the diacid component is based on 100 mol % of total diacid residues in the copolyester and the diol component is based on 100 mol % of total diol residues in the copolyester.

"DEG-suppressing additives" refer to any substance added from an external source during the process of making the copolyester to suppress the formation of DEG. Such additives include monocarboxylic acids such as acetic acid; buffers such as tetramethylammonium hydroxide, alkali or alkaline earth metal salts (e.g., sodium carbonate, potassium acetate, and magnesium acetate tetrahydrate); and tertiary amines such as trimethylamine, triethylamine, tripropylamine, triisopropylamine, tri-n-butylamine, triamylamine, trihexylamine, dimethyl hexylamine, and dimethylisopropylamine.

The expression "free of" means that the component referred to is not used in the making of, or not added to or incorporated into, the copolyester; or if used, added, or incorporated, not in an amount that materially changes a basic property or characteristic of the copolyester. For example, in the case of DEG-suppressing additives, they may not be used in the making of, or added to or incorporated into, the copolyester in an amount that lowers the DEG content of the copolyester by, for example, 0.1 weight percent or more.

In various embodiments, the process of making the copolyester does not include adding water or, if added, is not added in an amount that lowers the DEG content of the copolyester by, for example, 0.1 weight percent or more. Thus, in various embodiments, the copolyester is free of added water.

Methyl end groups (sometimes referred to as methylester end groups) are characteristic of polyesters made from DMT and EG. Polyesters made from TPA and EG tend not to form such end groups. The presence of methyl end groups may be determined by methods known in the art such as NMR.

In various embodiments, the copolyester with less than 0.5 wt % of methyl end groups comprises (a) a diacid component comprising 90 to 100 mol % of residues of terephthalic acid; and (b) a diol component comprising 50 to 90 mol % of residues of ethylene glycol and 10 to 50 mol % of residues of 1,4-cyclohexanedimethanol.

In various embodiments, the copolyester with less than 0.5 wt % of methyl end groups comprises (a) a diacid component comprising 90 to 100 mol % of residues of terephthalic acid; and (b) a diol component comprising 65 to 75 mol % of residues of ethylene glycol and 25 to 35 mol % of residues of 1,4-cyclohexanedimethanol.

In various embodiments, the copolyester with less than 0.5 wt % of methyl end groups comprises (a) a diacid component comprising 100 mol % of residues of terephthalic acid; and (b) a diol component comprising 65 to 75 mol % of residues of ethylene glycol and 25 to 35 mol % of residues of 1,4-cyclohexanedimethanol.

In various embodiments, the copolyester with less than 0.5 wt % of methyl end groups has an inherent viscosity of 0.6 to 0.9 dL/g.

In various embodiments, the copolyester with less than 0.5 wt % of methyl end groups comprises 0.9 wt % or less of DEG.

In various embodiments, the copolyester with less than 0.5 wt % of methyl end groups comprises 0.8 wt % or less of DEG.

In various embodiments, the copolyester with less than 0.5 wt % of methyl end groups comprises 0.7 wt % or less of DEG.

In various embodiments, the copolyester with less than 0.5 wt % of methyl end groups comprises 0.5 to 0.8 wt % of DEG.

In various embodiments, the copolyester with less than 0.5 wt % of methyl end groups comprises 0.5 to 0.7 wt % of DEG.

In various embodiments, the copolyester with less than 0.5 wt % of methyl end groups comprises 0.5 to 0.6 wt % of DEG.

In various embodiments, the copolyester with less than 0.5 wt % of methyl end groups is free of a transesterification catalyst.

To remove any doubt, the present invention includes and expressly contemplates and discloses any and all combinations of embodiments, features, characteristics, parameters, and/or ranges mentioned herein. That is, the subject matter of the present invention may be defined by any combination of embodiments, features, characteristics, parameters, and/or ranges mentioned herein.

It is contemplated that any ingredient, component, or step that is not specifically named or identified as part of the present invention may be explicitly excluded.

Any process/method, apparatus, compound, composition, embodiment, or component of the present invention may be modified by the transitional terms "comprising," "consisting essentially of," or "consisting of," or variations of those terms.

As used herein, the indefinite articles "a" and "an" mean one or more, unless the context clearly suggests otherwise. Similarly, the singular form of nouns includes their plural form, and vice versa, unless the context clearly suggests otherwise.

While attempts have been made to be precise, the numerical values and ranges described herein should be considered as approximations, unless the context indicates otherwise. These values and ranges may vary from their stated numbers depending upon the desired properties sought to be obtained by the present disclosure as well as the variations resulting from the standard deviation found in the measuring techniques. Moreover, the ranges described herein are intended and specifically contemplated to include all sub-ranges and values within the stated ranges. For example, a range of 50 to 100 is intended to include all values within the range including sub-ranges such as 60 to 90, 70 to 80, etc.

Any two numbers of the same property or parameter reported in the working examples may define a range. Those numbers may be rounded off to the nearest thousandth, hundredth, tenth, whole number, ten, hundred, or thousand to define the range.

The content of all documents cited herein, including patents as well as non-patent literature, is hereby incorporated by reference in their entirety. To the extent that any incorporated subject matter contradicts with any disclosure herein, the disclosure herein shall take precedence over the incorporated content.

This invention can be further illustrated by the following working examples, although it should be understood that these examples are included merely for purposes of illustration and are not intended to limit the scope of the invention.

EXAMPLES

Control and Example 1

PETG with 31 mol % of CHDM was prepared in a process as laid out in the FIGURE (except that Z4 and Z5 were housed in an integral unit) using TPA Paste Option #1 and EG Option #1 only, at two sets of conditions—one under typical operation conditions (Control) and one under low DEG conditions (Example 1). The conditions as well as the resulting copolyester compositions are reported in Table 3.

The polymers were analyzed by methods outlined in Table 4.

TABLE 3

| Sample Name | Control Typical | Example 1 Low DEG |
|---|---|---|
| EG:TPA Mole Ratio | 3.01 | 2.62 |
| EG:TPA Mole Ratio-Z1 | 3.01 | 2.62 |
| EG:TPA Mole Ratio-Z2 | 0 | 0 |
| EG:TPA Mole Ratio-Z3 | 0 | 0 |
| Rate (lbs/hr) | 10,069 | 10,069 |
| Z1 Temperature (° C.) | 253 | 262.5 |
| Z1 Pressure (psi) | 45 | 37 |
| Z2 Temperature (° C.) | 254 | 263 |
| Z2 Pressure (psi) | 27 | 9.5 |
| Z3 Temperature (° C.) | 265 | 270 |
| Z3 Pressure (torr) | 130 | 130 |
| Z4 and Z5 Temp (° C.) | 275.5 | 276 |
| Z4 Vacuum (torr) | 4.4 | 3.0 |
| Z5 Vacuum (torr) | 0.71 | 0.5 |
| Ti (ppm) | 11.6 | 11.4 |
| P (ppm) | 32.3 | 31.6 |
| IV | 0.758 | 0.797 |
| DEG (wt %) | 1.11 | 0.82 |

TABLE 4

| Method Name | Description |
|---|---|
| NMR | Determines the composition of the polymer (EG and CHDM mole %, DEG wt %) using NMR (nuclear magnetic resonance) spectroscopy. |
| X-ray spectroscropy | Determines the concentration of Ti and P in parts per million (ppm) of the polymer by X-ray fluorescence analysis of solids using a sequential X-ray spectrometer. |
| Inherent Viscosity | Determines the polymer inherent viscosity by dilute solution viscosity at 25° C. using a Viscotek Differential or Modified Viscometer according to ASTM D 5225, "Standard Test Method for Making Solution Viscosity of Polymers with a Different Viscometer." |

To reach the conditions outlined in Example 1 from Control, the temperatures, pressures, and EG:TPA mole ratios were simultaneously changed in a stepwise fashion as shown in Table 5. After each step, the operating conditions were allowed to stabilize for 6-48 hours before proceeding to the next step to minimize disturbances and maintain product quality.

TABLE 5

| Step | Z1 Pressure (psi) | Z1 Temperature (° C.) | Z2 Pressure (psi) | Z2 Temperature (° C.) | EG:TPA Mole Ratio |
|---|---|---|---|---|---|
| 1 | 43 | 257 | 23 | 257 | 3.01 |
| 2 | 41 | 259 | 18 | 259 | 2.80 |
| 3 | 39 | 261 | 14 | 261 | 2.70 |
| 4 | 37 | 263 | 9.5 | 263 | 2.62 |

While Table 5 shows that the processing conditions were changed simultaneously in a stepwise fashion, the changes can be made either individually or simultaneously in small increments (e.g., ~5% of initial value), and the way the changes are enacted generally do not affect the composition of the final product once the conditions have stabilized.

The invention has been described in detail with particular reference to specific embodiments thereof, but it will be understood that variations and modifications can be made within the spirit and scope of the invention.

We claim:

1. A process for preparing a copolyester, the process comprising:
    (a) introducing 1,4-cyclohexanedimethanol (CHDM) and a first portion of fresh ethylene glycol (EG1) into a first reaction zone (Z1);
    (b) reacting EG1 and CHDM with a diacid in Z1 to form a first esterification product comprising copolyester monomers, oligomers, or both and unreacted EG1, CHDM, and diacid;
    (c) withdrawing from Z1 an esterification recycle stream comprising unreacted EG1, CHDM, and diacid;
    (d) passing the esterification recycle stream to a heat exchanger;
    (e) heating the esterification recycle stream in the heat exchanger to form a heated esterification recycle stream;
    (f) passing the heated esterification recycle stream back to Z1;
    (g) introducing fresh diacid comprising terephthalic acid, isophthalic acid, or mixtures thereof (g1) upstream of the heat exchanger into the esterification recycle stream or (g2) downstream of the heat exchanger into Z1;

(h) passing the first esterification product to a second reaction zone (Z2);
(i) introducing a second portion of fresh ethylene glycol (EG2) into Z2;
(j) esterifying the unreacted EG1, CHDM, and diacid in the first esterification product and EG2 in Z2 to form a second esterification product comprising additional copolyester monomers, oligomers, or both;
(k) passing the second esterification product to a third reaction zone (Z3);
(l) introducing a third portion of fresh ethylene glycol (EG3) into Z3;
(m) polycondensing the second esterification product in the presence of a polycondensation catalyst in Z3 to form a prepolymerization product comprising copolyester oligomers;
(n) passing the prepolymerization product to one or more reaction zones (ZF); and
(o) polycondensing the prepolymerization product in the presence of the polycondensation catalyst in ZF to form a copolyester containing 1.0 wt % or less of diethylene glycol (DEG), without requiring the use of DEG-suppressing additives, wherein the overall molar ratio of EG:TPA introduced into the process ranges from 2.3:1 to 2.9:1 where EG is the sum of EG1, EG2, and EG3 in moles.

2. The process of claim 1, wherein the fresh diacid is introduced (g1) upstream of the heat exchanger into the esterification recycle stream.

3. The process of claim 1, wherein the fresh diacid is introduced (g2) downstream of the heat exchanger into Z1.

4. The process of claim 1, wherein the overall molar ratio of EG:TPA introduced into the process ranges from 2.3:1 to 2.71:1 where EG is the sum of EG1, EG2, and EG3 in moles.

5. The process of claim 1, wherein the molar ratio of EG1:TPA ranges from 2.3:1 to 2.69:1, the molar ratio of EG2:TPA ranges from 0:0.1:1 to 0.15:1, and the molar ratio of EG3:TPA ranges from 0.01:1 to 0.15:1.

6. The process of claim 1, wherein the reacting step (b) in Z1 is carried out at a melt temperature of 250 to 270° C. and a pressure of 25 to 40 psi; or wherein the reacting step (b) in Z1 is carried out at a melt temperature of 257 to 265° C. and a pressure of 30 to 40 psi.

7. The process of claim 1, wherein the esterifying step (j) in Z2 is carried out at a melt temperature of 250 to 270° C. and a pressure of 8 to 20 psi; or wherein the esterifying step (j) in Z2 is carried out at a melt temperature of 257 to 265° C. and a pressure of 8 to 20 psi.

8. The process of claim 1, wherein the copolyester comprises:
(a) a diacid component comprising 90 to 100 mol % of residues of terephthalic acid; and
(b) a diol component comprising 50 to 90 mol % of residues of ethylene glycol and 10 to 50 mol % of residues of 1,4-cyclohexanedimethanol, wherein the diacid component is based on 100 mol % of total diacid residues in the copolyester and the diol component is based on 100 mol % of total diol residues in the copolyester; or
wherein the copolyester comprises:
(a) a diacid component comprising 90 to 100 mol % of residues of terephthalic acid; and
(b) a diol component comprising 65 to 75 mol % of residues of ethylene glycol and 25 to 35 mol % of residues of 1,4-cyclohexanedimethanol,
wherein the diacid component is based on 100 mol % of total diacid residues in the copolyester and the diol component is based on 100 mol % of total diol residues in the copolyester.

9. The process of claim 1, wherein the copolyester has an inherent viscosity of 0.6 to 0.9 dL/g.

10. The process of claim 1, wherein the copolyester comprises 0.9 wt % or less of DEG; or wherein the copolyester comprises 0.8 wt % or less of DEG; or wherein the copolyester comprises 0.7 wt % or less of DEG.

11. The process of claim 1, wherein the copolyester comprises 0.5 to 0.8 wt % of DEG; or wherein the copolyester comprises 0.5 to 0.7 wt % of DEG; or wherein the copolyester comprises 0.5 to 0.6 wt % of DEG.

* * * * *